June 12, 1956

J. U. WHITE 2,749,793

OPTICAL SYSTEM FOR RESHAPING BEAM OF LIGHT

Filed Aug. 29, 1952

INVENTOR
JOHN U. WHITE
BY
Curtis Morris & Safford.
ATTORNEYS

United States Patent Office 2,749,793
Patented June 12, 1956

2,749,793
OPTICAL SYSTEM FOR RESHAPING BEAM OF LIGHT

John U. White, Darien, Conn.

Application August 29, 1952, Serial No. 306,999

3 Claims. (Cl. 88—1)

This invention relates to optical systems and more particularly to apparatus for altering the shape of a beam of light. For example, when a light beam having circular cross section is used to illuminate the narrow slit of a spectrograph, only a small part of the light beam is intercepted by the slit. However, if the beam is re-shaped into a rectangular cross-section of substantially the same dimensions as the slit, a much larger proportion of the light can be made to pass through the slit. Devices for accomplishing this are termed image slicers or image transformers, and have particular utility when the source of light is weak and the highest optical efficiency must be achieved.

Optical systems for changing the shape of an incident light beam to make it conform to the spectrographic slit have been proposed heretofore and have been useful in particular applications. For example, in the September 1938 issue of the Astrophysical Journal, pages 113 to 124, an image slicer is described in an article by I. S. Bowen. This image slicer consists of a number of small mirrors mounted directly in front of the slit, across which the beam passes at a slight angle to the slit. These mirrors are arranged to reflect narrow sections of the image through the slit, one above another. However, mirrors do not all lie in the true focal plane.

Another device is described by William Benesch and John Strong, on pages 252 to 254 of the April 1951 issue of the Journal of the Optical Society of America. In this system, three plane mirrors are used in an intermediate focal plane together with three separate concave mirrors which focus three secondary images, one above the other, onto the slit. This arrangement requires both plane and concave mirrors.

In accordance with the present invention, an improved relatively simple and economical image slicer is provided. For use in those parts of the spectrum where satisfactory transparent materials are not available, mirrors can be used to provide the reflecting surfaces. In a preferred embodiment, the entire system is built up from conventional prisms arranged to divert and re-position certain portions of the incident beam, the effective path length of all portions of the beam being equal.

The various aspects, objects, and advantages of this invention will be in part pointed out in and in part apparent from the following description of a preferred embodiment of the invention considered in conjunction with the accompanying drawing, in which.

Figure 1:
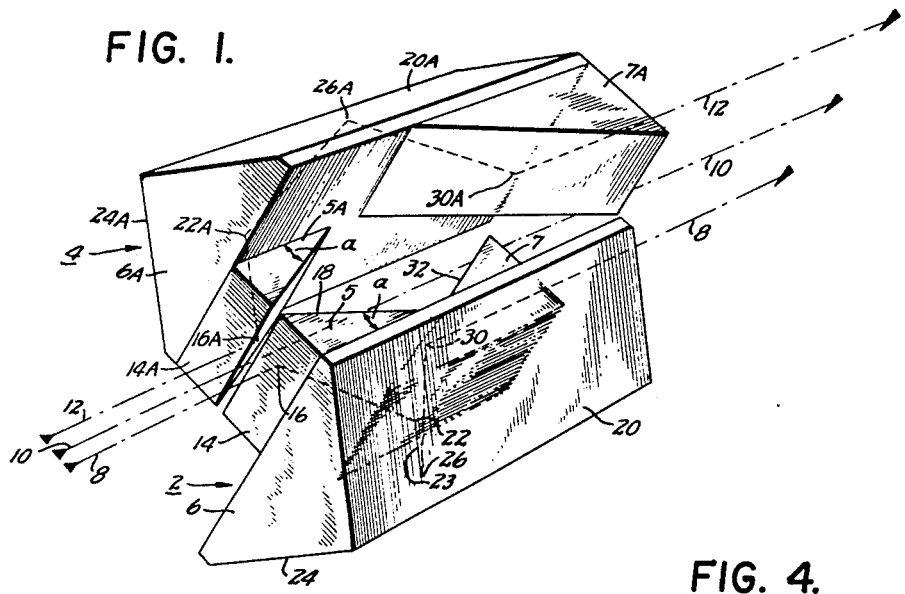
Figure 1 is a perspective view of an image slicer embodying the present invention.

As shown in Figure 1, the image slicer includes two similar portions, generally idicated at 2 and 4, each formed of a number of transparent prisms and positioned in spaced relationship as shown in the drawing. The right-hand portion 2 of the optical system includes a small 30°–60° prism 5 which is secured to the face of a larger 45° prism 6, that in turn supports another 30°–60° prism 7 of intermediate size.

The other portion 4 of the optical system is formed of identical components indicated, respectively, by the same numerals with the addition of the suffix "A," arranged as shown.

The prisms which form each of these halves of the optical system are cemented together with transparent cement having a refractive index preferably near that of the material from which the prisms are formed. The prisms may be formed of any material, such as glass or quartz, that is transparent to the portion of the spectrum which is to be used.

The two prism assemblies 2 and 4 which form the image slicer are supported, by any suitable mechanical means (not shown), in the indicated relative positions so that a narrow slit remains between the adjacent parallel edges of the two prisms 5 and 5A, this slit being positioned to intercept the beam of light which is to be re-shaped.

The operation of the device can be understood most readily by tracing the paths of three rays 8, 10, and 12 of an incident light beam which may be assumed to have a circular cross section and to be approaching the optical system from a direction substantially perpendicular to the faces 14 and 14A of the prisms 5 and 5A, respectively.

The centrally-positioned ray 10 passes through the slit between the two prisms 5 and 5A and between the two prism assemblies 2 and 4 of the optical system and is not deflected.

The right-hand ray 8 enters the prism 5 through the face 14 and is reflected, as indicated at 16, by the hypotenuse face 18 of the prism 5 into the 45° prism 6. (See also Figure 2.) This ray 8 then strikes the upper 45° prism face 20 (see also Figure 3), as at 22, is reflected downwardly and forwardly, along the path 23, to the other 45° face 24 which reflects it, as at 26, toward the prism 7.

This ray 8 is then reflected, as at 30, by the hypotenuse surface 32 of the prism 7 into a line parallel with its original direction but off-set vertically and horizontally from its original path, that is, downwardly and to the left as viewed in Figure 1.

The other ray 12 traverses a similar path with corresponding reflections in the other prism assembly, the corresponding points of reflection and surfaces of the prism being indicated by corresponding reference characters followed by the suffix A. It will be noted, however, that the ray 12 is deflected from the lower to the upper face of the prism 6A because this ray is to be displaced upwardly instead of downwardly. This ray emerges from the prism assembly off-set upwardly and to the right, as shown in Figure 1, so that the three rays emerge along a vertical line.

The amount of vertical off-set depends upon the size of the 45° prisms 6 and 6A. The amount of horizontal off-set depends upon the positions of the 30° prisms 7 and 7A on the surfaces of the prisms 6 and 6A, respectively.

The central ray 10 passes through the opening between the prisms 5 and 5A so that its path is completely in air. The rays 8 and 12 are reflected along the paths indicated above so that the actual length of the paths is longer than the path of the ray 10. However, the refractive index of the material from which the prisms are formed reduces the effective optical length of the paths of the rays 8 and 12. Accordingly, the prism assembly may be constructed so that the effective optical paths of the rays 8 and 12 are equal to the length of the path of the ray 10. If the system is constructed in this manner, the virtual image of the front surface of the prisms 5 and 5A formed by the rays 8 and 10 is directly above and below, respectively, the opening between the two prisms 5 and 5A. If a lens were placed in the light emerging from the prism system, it would form a real image of this composite virtual image.

In order to accomplish this result with the prism angles and sizes of the present embodiment, the refractive index of the glass from which the prisms are formed is 1.628. It is not necessary that the glass be chosen to have exactly this refractive index because a correction factor can be introduced by changing the length of the prisms 6 and 6A so as to change the effective optical lengths of the paths of rays 8 and 12 at a rate different from that of the ray 10.

Thus, the conditions for the establishment of the proper image characteristics depends upon the choice of prism material and angles, the sizes of the prisms, and the positions of the prisms.

Figure 2:
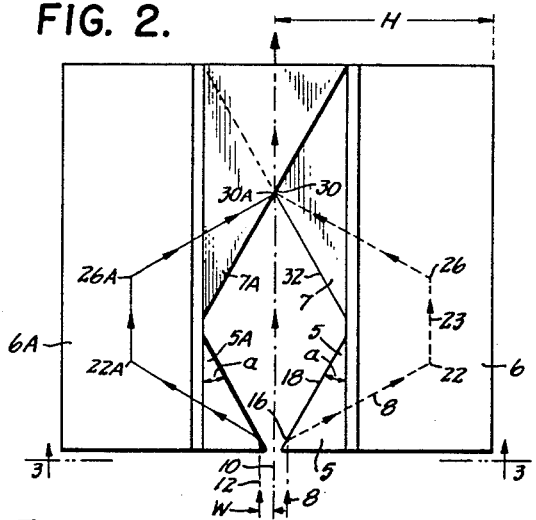
Figure 2 is a plan view of the optical system of Figure 1 showing the projection of typical rays passing through the system.

If "$a$" is the prism angle of the prisms 5 and 5A as indicated in Figures 1 and 2, the length of the path in the glass, designated by P, between the first and last reflection is:

$$P = \frac{2H - W}{\sin 2a}$$

where H is the total horizontal distance from the apex of the prism 6 to the center plane of the outgoing rays, as indicated in Figure 2, and W is the length of the horizontal off-set produced on the rays 8 and 12 by the optical system.

An additional portion, Q, of the distance is defined as the sum of the distance between the first surface 14 and the first reflection from the surface 18 and the distance between the last reflection from the surface 32 and the last surface of the prism 7. These distances may be adjusted at will, for example, by the relative placement of the two prism assemblies. The effective length L of the optical paths for the rays 8 and 12 is then $$L = \frac{P + Q}{n}$$

where "$n$" is the refractive index of the glass.

The corresponding air path length M for the ray 10 is:

$$M = \frac{2H - W}{\tan 2a} + Q$$

If these two quantities are made equal to each other, $L = M$, to form the virtual images at the proper points directly and above and below the first surface of the system, $$Q = \frac{2H - W}{\sin 2a} \cdot \frac{1 - n \cos 2a}{n - 1}$$

A typical set of values that give vertical offsets of 10 millimeters and horizontal off-sets of .5 millimeter using glass having an index of refraction of 1.628, are: $H = 16.0$ millimeters, $W = 0.5$ millimeter, $a = 30$. With this refractive index, Q is adjusted to be 10.8 millimeters. This value makes the distance from the last reflections at points 30 and 30A to the back surface, large enough to accommodate angular apertures up to about f–3 without vignetting in the horizontal plane.

In the above calculations, the dispersion of the glass has been neglected and no correction has been made for it. Accordingly, it is desirable that the dispersion of the glass be as small as possible. With a dispersion of 60, the difference in position between the images formed in F and C light is, for example, considered 0.3 millimeter. When the focus is corrected from the mid-point of this range, the error is only 0.15 millimeter, and for most applications the spreading of the image as a result of this focal error is negligible.

It will be apparent that solid transparent structures have several important advantages including the possibility of equalizing the optical path lengths, but reflecting surfaces formed by mirrors can also be used in those instances where equal path lengths are not essential or where suitable transparent materials are not available for the portion of the spectrum being utilized.

Figure 4:
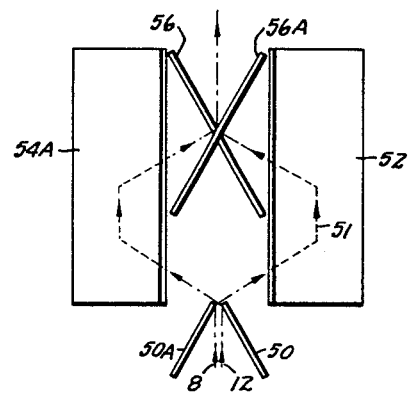
Figure 4 is a plan view of an image slicer using mirrors for the reflecting surfaces.
Figure 3:
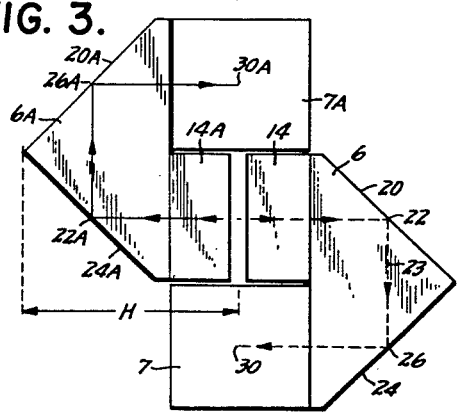
Figure 3 is an elevational view taken along line 3—3 of Figure 2 showing a side projection of the displaced rays.
Figure 5:
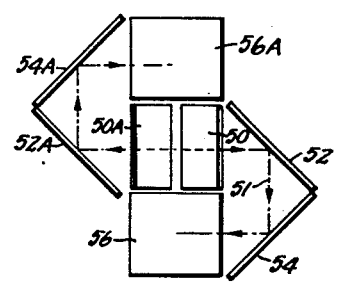
Figure 5 is an elevational view of the image slicer of Figure 4.

Figures 4 and 5 show an optical system in which mirrors have been used to replace each of the reflecting surfaces of the prisms of Figures 1, 2, and 3. In the plan view of Figure 4, which corresponds to the plan view of Figure 2, two mirrors 50 and 50A are positioned at an acute angle with the direction of the beam and are arranged to intercept it as indicated by the lines 8 and 12. These mirrors are positioned so that the reflected rays cross each other, whereas in the earlier-described embodiment the rays were deflected outwardly without first crossing over. It will be seen, however, that the effect is the same and that the angle of incidence at which the rays strike the mirrors 50 and 50A may be identical with the angles of incidence of the surfaces 18 and 18A. Arranging the mirrors 50 and 52 as shown prevents the supporting structure of the mirror surface from obstructing part of the central portion of the beam that does not strike the mirror surfaces.

The rays which strike the mirror 50A are reflected onto a mirror 52 and then along a path 51 into a mirror 54, corresponding respectively in position and function to the surfaces 20 and 24. These rays from the mirror 54 are reflected by a mirror 56, which corresponds to the surface 32 of the prism 7, to follow a path parallel with but offset from the unintercepted portion 10 of the beam. The other intercepted portion 12 of the beam is reflected in a corresponding manner successively by mirrors 50, 52A, 54A, and 56A.

No supporting structure for the mirrors of Figures 4 and 5 has been shown in the drawings in order to render the manner of operation more easily understood, but any suitable supporting means may be used so long as its parts do not project into any of the light paths.

From the foregoing, it will be apparent that the image slicer embodying the invention claimed herein is well adapted for the attainment of the ends and objects hereinbefore set forth, and that it can be modified or constructed readily in different forms so as to best suit the requirements of each particular use.

I claim:

1. An optical system for reshaping a beam of light comprising a solid transparent structure arranged to intercept part of said beam and having four angularly-positioned reflecting surfaces arranged to reflect said part diagonally to a new path parallel with but offset laterally from the original path of said part of said beam, the first of said reflecting surfaces being set at an angle of incidence greater than 45 degrees from said original path, the second and third of said reflecting surfaces being at right angles to each other, and the fourth of said reflecting surfaces being set at an angle to the light falling on it equal to said angle of incidence, the refractive index of said structure being such that the length of the path of said intercepted part of said beam in said structure divided by said refractive index is equal to the length of the path of the non-intercepted part of said beam beside said structure.

2. An optical system for reshaping a beam of light comprising first and second light-reflecting structures each arranged to intercept a separate part of said beam and each having four angularly-positioned reflecting surfaces arranged to reflect the intercepted part of the beam diagonally to a new path parallel with but offset laterally from the original path of said part of the beam before interception, the first of said reflecting surfaces being set at an angle of incidence greater than 45 degrees from said original path, the second and third of said reflecting surfaces being at right angles to each other, and the fourth of said reflecting surfaces being set at an angle to the light falling upon it equal to said angle of incidence, and means for supporting said structures in fixed spaced relationship whereby opposite portions of said light beam will be intercepted respectively by said first reflecting surfaces of said structure and the central portion of said beam passes between said structures, said structures each including a plurality of prisms the interior surfaces of which form said reflecting surfaces, said prisms being formed of solid transparent material having an index of refraction such that the length of the paths of the intercepted parts of said beam in each of said structures divided by said refractive index is equal to the length of the path of the non-intercepted part of the beam passing between said two structures.

3. An image slicer for reshaping a beam of light, comprising first, second, and third prisms formed of material transparent to said beam, said prisms being secured together along planar interfaces to form an integral transparent assembly, said first prism having an exposed surface positioned to intercept a portion of said beam and a second surface positioned to reflect rays passing through said exposed surface diagonally into the hypotenuse face of said second prism, said second prism being oriented with its axis parallel to the path of the original beam and having a first reflecting surface positioned to reflect rays from said first prism and a second reflecting surface positioned to receive rays from said first surface and reflect them into said third prism, said third prism having a reflecting surface positioned to intercept the rays from the second prism and reflect them along a path substantially parallel to and displaced from the path of undeflected rays of the original beam, said third prism having an exposed surface substantially perpendicular to and intercepting the path of the rays reflected by its reflecting surface, said first and second surfaces of said first and third prisms each defining angles of approximately 60 degrees and the refractive index of said transparent material being approximately 1.62.

References Cited in the file of this patent

UNITED STATES PATENTS

| | | |
|---|---|---|
| 1,485,956 | Bredon | Mar. 4, 1924 |
| 1,687,030 | Mitchell | Oct. 9, 1928 |

FOREIGN PATENTS

| | | |
|---|---|---|
| 329,737 | France | May 9, 1903 |
| 129,089 | Great Britain | June 30, 1919 |
| 124,501 | Australia | June 5, 1947 |